United States Patent [19]

Edwards

[11] Patent Number: 5,832,706
[45] Date of Patent: Nov. 10, 1998

[54] HEDGER/CUTTING UNIT WITH BLADE COUPLING UNIT AND METHOD FOR CUTTING VEGETATION PROFILES

[75] Inventor: John W. Edwards, Arcadia, Fla.

[73] Assignee: Advanced Contracting and Hedging, Inc., Sarsota, Fla.

[21] Appl. No.: 547,455

[22] Filed: Oct. 24, 1995

[51] Int. Cl.⁶ ..................................................... A01D 34/86
[52] U.S. Cl. ............................... 56/15.2; 56/315; 56/319; 56/DIG. 17
[58] Field of Search ..................................... 56/15.2, 15.1, 56/235, 238, 255, 295, 315, 319, 320, DIG. 17

[56] References Cited

U.S. PATENT DOCUMENTS

| | | |
|---|---|---|
| 3,032,956 | 5/1962 | Mullet . |
| 3,061,996 | 11/1962 | Ripps . |
| 3,087,296 | 4/1963 | Cowles . |
| 3,116,583 | 1/1964 | Mason . |
| 3,136,106 | 6/1964 | Joslin . |
| 3,138,911 | 6/1964 | Pounds . |
| 3,192,695 | 7/1965 | Leydig et al. . |
| 3,246,460 | 4/1966 | Patterson et al. . |
| 3,263,516 | 8/1966 | Chisholm . |
| 3,319,407 | 5/1967 | Jordan et al. . |
| 3,343,575 | 9/1967 | Trout . |
| 3,418,790 | 12/1968 | Whitfield et al. . |
| 3,559,385 | 2/1971 | Eaton . |
| 3,624,698 | 11/1971 | Storm . |
| 3,653,193 | 4/1972 | Conghran, Jr. . |
| 3,785,705 | 1/1974 | Binger et al. . |
| 3,852,945 | 12/1974 | Berry et al. . |
| 3,949,539 | 4/1976 | Cartner . |
| 3,952,783 | 4/1976 | Windsor . |
| 4,063,359 | 12/1977 | Luscombe . |
| 4,121,777 | 10/1978 | Kolstad et al. . |
| 4,241,565 | 12/1980 | Parsons, Jr. . |
| 4,302,922 | 12/1981 | Guerndt, Jr. et al. . |

(List continued on next page.)

FOREIGN PATENT DOCUMENTS 2-309-458  2/1973  Germany .
313674  12/1971  U.S.S.R. .

OTHER PUBLICATIONS

TH–1100–L Hedger Brochure, TOL, Inc. (Date Unknown).
HS 750 Hedger Brochure, Universal Pruning Machine, TOL, Inc. (Date Unknown).
Photograph A—Trailer Mounted Dual Boom Hedger; Citrus Systems, Inc. (Date Unknown).
Photograph B—Rotatably Mounted Arm with Overlapping Blades—Bancroft Citrus Enterprises (Date Unknown).
Photograph C—Trailer Mounted Topping Hedger (Date Unknown).

(List continued on next page.)

Primary Examiner—Terry Lee Melius
Attorney, Agent, or Firm—Oliff & Berridge, PLC.

[57] ABSTRACT

A hedger includes a raisable platform, a telescoping main boom member pivotably attached at one end to the platform, and at least a first boom member pivotably attached to and extending in a first direction from an opposite end of the main boom member. The first boom member rotatably supports at least one cutting blade. A second boom member is pivotably attached to an end portion of the first boom member and extends in a second direction from the opposite end of the main boom member. The second boom member also rotatably supports at least one cutting blade. The first and second boom members of the hedger are pivotable relative to each other and relative to the main boom member. As a result, the structure of the invention enables multiple cutting blade configurations or profiles. Moreover, the platform includes structure enabling the main boom member to achieve a substantially horizontal attitude. A pivot linkage connected between the first boom member and the second boom member enables the second boom member to pivot through 180° relative to the first boom member. A blade coupling unit is also provided, securing the cutting blades in a triple locking arrangement.

39 Claims, 11 Drawing Sheets

U.S. PATENT DOCUMENTS

| | | |
|---|---|---|
| 4,323,009 | 4/1982 | Voigt . |
| 4,350,190 | 9/1982 | McColl . |
| 4,353,275 | 10/1982 | Colville . |
| 4,355,497 | 10/1982 | Murphy ................................. 56/235 |
| 4,411,070 | 10/1983 | Boyum et al. . |
| 4,445,557 | 5/1984 | Peters, III . |
| 4,502,269 | 3/1985 | Cartner . |
| 4,509,315 | 4/1985 | Giguere . |
| 4,707,971 | 11/1987 | Forpahl et al. . |
| 4,773,455 | 9/1988 | Lessard . |
| 4,775,287 | 10/1988 | Hering, Sr. . |
| 4,775,288 | 10/1988 | Dimitriu . |
| 4,832,412 | 5/1989 | Bertrand . |
| 4,887,417 | 12/1989 | Parsons, Jr. . |
| 4,901,508 | 2/1990 | Whatley . |
| 5,031,389 | 7/1991 | Yawn et al. . |
| 5,133,174 | 7/1992 | Parsons, Jr. . |
| 5,209,049 | 5/1993 | Heard . |
| 5,210,997 | 5/1993 | Mountcastle, Jr. . |
| 5,341,629 | 8/1994 | Penner . |
| 5,430,999 | 7/1995 | Grant . |
| 5,438,819 | 8/1995 | Dallman ................................. 56/295 |
| 5,622,035 | 4/1997 | Kondo et al. ..................... 56/255 X |
| 5,640,836 | 6/1997 | Lingerfelt ............................. 56/255 |

OTHER PUBLICATIONS

Photographs D–G—Topping Hedger Having Blades Mounted on Triangular Platforms (Date Unknown).

Photograph H—Topping Hedger Having Three Point Star Wheel—Jimmy Hern (Date Unknown).

Photographs I–L—Dual Boom Hedger—Citrus, Inc. (Date Unknown).

Photographs M–O—Dual Boom Hedger—Orange Services (Date Unknown).

Photographs P–R—L–Shaped Dual Boom Hedger—Orange Services (Date Unknown).

Photograph S—Dual Boom Hedger—Advanced Contracting and Hedging, Inc. (Date Unknown).

Phillips, R.L.; "Pruning Principles and Practices for Florida Citrus"; Florida Cooperative Extension Service Institute of Food and Agricultural Sciences, Un. of Florida, Circular 477. pp. 3–23. (Date Unknown).

HD 1600 Dual Boom Hedger Brochure; TOL Incorporated. (Date Unknown).

HD 1600 K Dual Boom Hedger Brochure and Price List; TOL Incorporated. (Date Unknown).

HD 2200 Dual Boom Hedger Brochure and Price List; TOL Incorporated. (Date Unknown).

140G Motor Grader Brochure; Cat (Date Unknown).

75

HEDGER/CUTTING UNIT WITH BLADE COUPLING UNIT AND METHOD FOR CUTTING VEGETATION PROFILES

BACKGROUND OF THE INVENTION

1. Field of the Invention

The present invention relates to a hedger/cutting unit including a blade coupling unit and, more particularly, to a hedger/cutting unit that includes an expanded cutting area and multiple cutting configurations. The invention also relates to a method for cutting vegetation along single and multiple plane profiles.

2. Description of the Related Art

Paths and roads cut along tree lines often become obstructed by growing vegetation. The hedging apparatus or cutting unit can be used to hedge the growing trees and to clear the road or path.

Conventional hedgers include a plurality of rotating cutting blades fixed to a stationary or rotating cutting blade arm. The cutting blade arm may be controllably attached to an industrial vehicle for numerous cutting operations, including topping, skirting and hedging.

The conventional devices, however, generally have a limited cutting area. Moreover, the conventional devices generally have a single blade supporting arm, limiting the configurations of the blades. Still further, conventional hedgers lack structure enabling cutting over obstacles and lack structure enabling multiple blade configurations.

SUMMARY OF THE INVENTION

It is therefore an object of the present invention to provide a hedger/cutting unit having a blade coupling unit that overcomes the deficiencies of conventional hedgers. In particular, it is an object of the invention to provide a hedger/cutting unit that is extendible above and over obstacles, that includes structure enabling multiple blade configurations, and that can more efficiently cover a greater cutting area in a single pass.

These and other objects and advantages of the invention are achieved by providing a hedger including a raisable platform, a telescoping main boom member pivotably attached at one end to the platform, and at least a first boom member pivotably attached to and extending in a first direction from an opposite end of the main boom member. The first boom member rotatably supports at least one cutting blade.

A second boom member may be pivotably attached to an end portion of the first boom member and extend in a second direction from the opposite end of the main boom member. The second boom member also rotatably supports at least one cutting blade.

In accordance with preferred aspects of the invention, a driving device pivotably drives the second boom member relative to the first boom member. The hedger may include a pivot linkage coupling the driving device and the second boom member that is configured to enable the second boom member to pivot 180° relative to the first boom member. The pivot linkage preferably includes a fixed portion fixed to the end portion of the first boom member, a first linkage arm pivotably attached to the fixed portion, a second linkage arm pivotably attached to the first linkage arm, and a third linkage arm pivotably attached at one end to the second linkage arm and at an opposite end to the end portion of the first boom member spaced from the fixed portion. The third linkage arm is structured for rotation with the second boom member.

The first boom member is preferably disposed offset from the second boom member in a hedger driving direction. Furthermore, the at least one cutting blade mounted on the first boom member may be aligned with the at least one cutting blade mounted on the second boom member in a plane substantially parallel to the hedger driving direction.

The first and second boom members may comprise a plurality of cutting blades. An uppermost one of the cutting blades mounted on the first boom member is preferably disposed overlapping a lowermost one of the cutting blades mounted on the second boom member in a plane substantially parallel to the hedger driving direction.

In accordance with further aspects of the invention, the platform is pivotably attached to the hedger, and the hedger further includes a platform tilting device coupled to the platform that tilts the platform about an axis substantially perpendicular to the hedger driving direction.

In addition, the platform may include a platform arm extending from one side of the platform with the telescoping main boom member being attached to the platform at an opposite side of the platform. A main boom driving device is provided attached at one end to the platform arm spaced from the platform and at an opposite end to the telescoping main boom member.

In accordance with still further aspects of the invention, the hedger may include a blade coupling unit including a back plate secured to a rotatable blade shaft and disposed on a hedger side of the blade, a front plate disposed on an outer side of the blade, thereby sandwiching the blade with the back plate, at least one bolt secured through a corresponding at least one hole in the back plate, the cutting blade and the front plate, and a locking member fixed to the rotatable blade shaft outside of the front plate such that the front plate is sandwiched between the locking member and the cutting blade. In this regard, the rotatable blade shaft may include a threaded end portion extendible through a central hole in the back plate, the cutting blade and the front plate. The back plate is threaded in a first direction on the threaded end portion and the locking member is threaded in a second direction on the threaded end portion. The first direction preferably corresponds to a direction opposite from a blade rotation direction, and the second direction preferably corresponds to the blade rotation direction.

The back plate may include a plurality of wrench holes configured to receive a wrench for removing the back plate from the rotatable blade shaft.

In accordance with another aspect of the invention, there is provided a hedger comprising a main boom, a first boom member coupled to the main boom and having at least a first cutting blade, a second boom member pivotably connected to the first boom member, the second boom member having at least a second cutting blade. The first and second blades form a continuous cutting profile regardless of the relative positioning of the first and second boom members.

In accordance with another aspect of the invention, there is provided a method for cutting vegetation using a hedger having cutting blades. The method comprises mounting the hedger on a vehicle that travels along the vegetation, providing a menu of cutting profiles including a range encompassing substantially single plane cutting profiles and substantially perpendicular multiple plane profiles, selecting a selected cutting profile from the menu of cutting profiles, adjusting the cutting blades to create the selected cutting profile, and cutting the overgrown vegetation based on the selected cutting profile as the vehicle travels along the vegetation.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
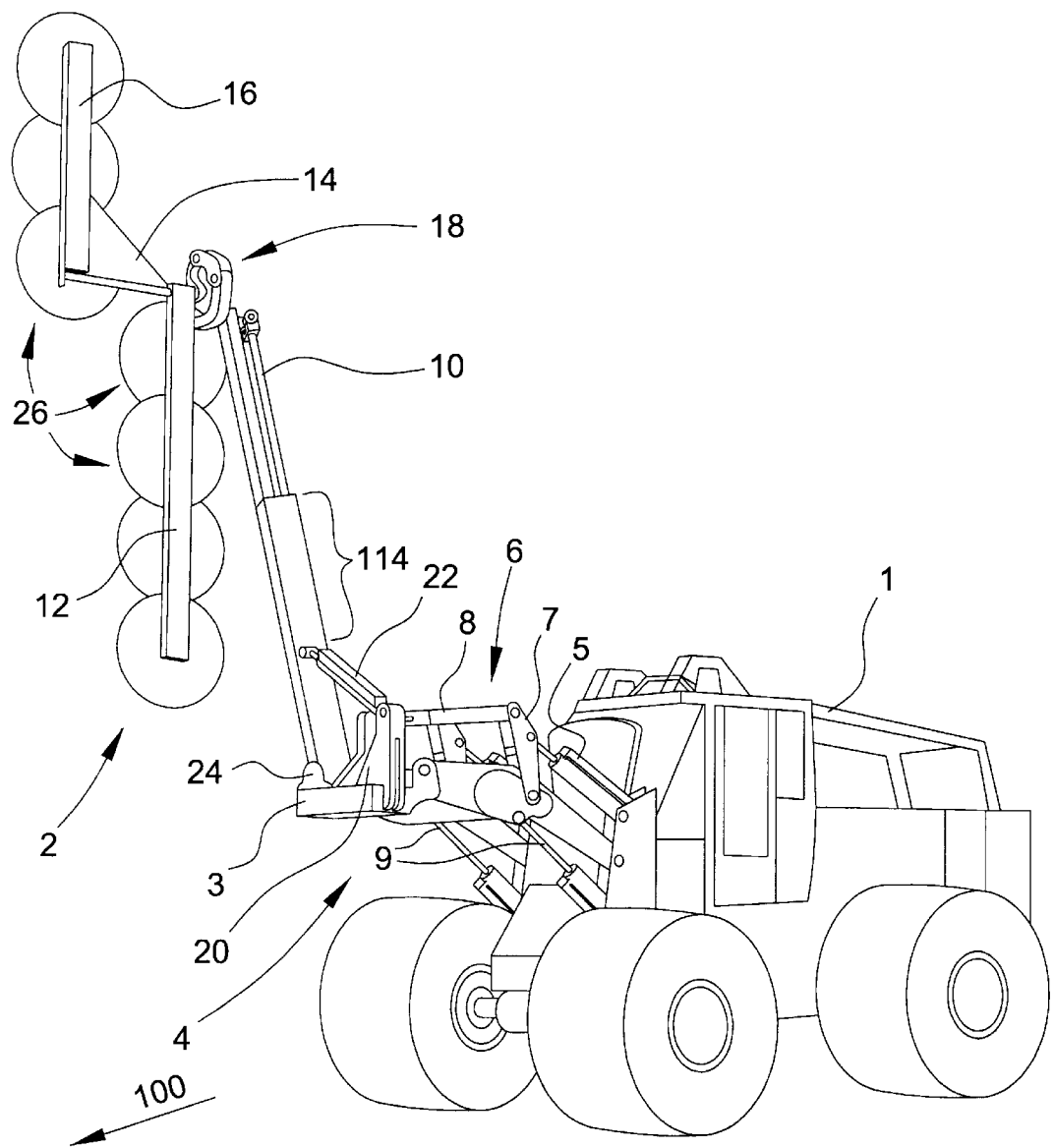
FIG. 1 is a perspective view of the hedger according to the present invention.

The invention will be described with reference to FIGS. 1–6E. Referring to FIG. 1, an industrial vehicle 1 is fitted with a cutting unit 2 for hedging operations. The cutting unit 2 includes a raisable platform 3 that is fixed to a lifting structure 4 of the industrial vehicle 1.

The lifting structure 4 includes a pair of platform tilting cylinders 5 connected to the platform 3 through a tilt linkage 6. The tilt linkage 6 includes a first pivotable bracket 7 extending from the lifting structure 4. The first pivotable bracket 7 is connected to the platform 3 by a second pivotable bracket 8. The lifting structure also includes additional cylinders 9 to provide lifting of the platform 3.

Figure 2:
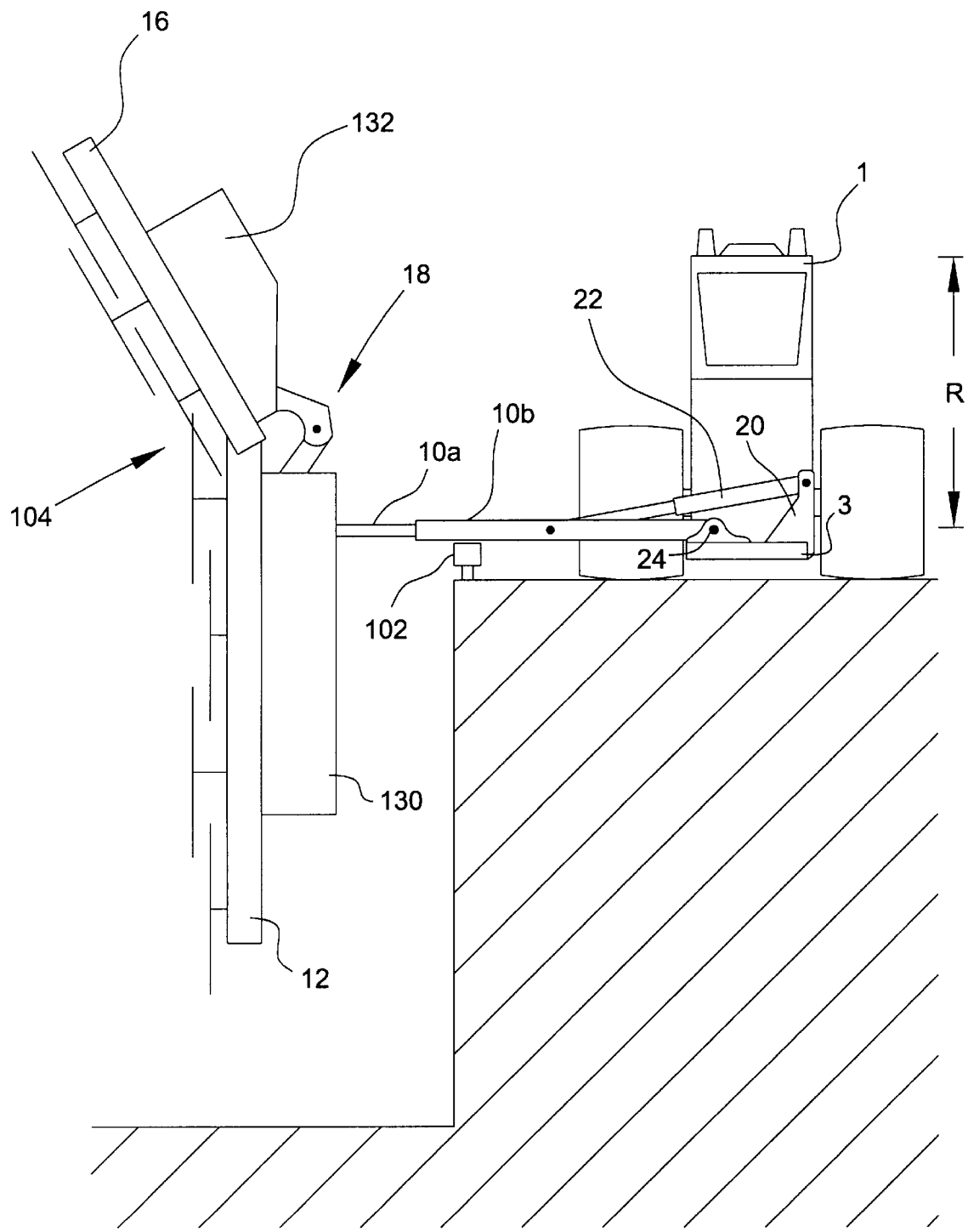
FIG. 2 is a front elevation view of the hedger according to the present invention.

The lifting structure 4 is capable of lifting the platform 3 within a range R between a raised position as shown in FIG. 1 and a lowered position as shown in FIG. 2. (In FIG. 2, details of the lifting structure 4 and the tilt linkage 6 are eliminated for clarity.) Furthermore, the entire platform 3 can be pivoted forwards or backwards about an axis perpendicular to a driving direction 100 of the industrial vehicle 1 over a range of approximately 90°.

A telescoping main boom 10 extends from one side of the platform 3. The telescoping main boom 10 supports a first boom member 12 attached to the main boom 10 at an end thereof. A second boom member 16 is connected to an end portion of the first boom member 12 through a boom member arm 14. A pivot linkage 18 (described below) enables the second boom member 16 to pivot 180° relative to the first boom member 12.

The platform 3 includes a platform arm 20 extending upward from the platform 3 at a side of the platform 3 opposite from the main boom 10. The telescoping structure of main boom 10 is conventional and will not be described in detail. FIG. 2 shows an example wherein the telescoping function is provided using a first telescoping member 10*a* that slides within a second telescoping member 10*b*. Mating portions of the first and second telescoping members may be provided with TEFLON® coatings to reduce friction.

A main boom driving cylinder 22 is connected between an upper end portion of the platform arm 20 and the main boom 10. The main boom driving cylinder 22 drives the main boom 10 to pivot about an axis 24. Because the main boom driving cylinder 22 is disposed above the platform by a distance defined by the platform arm 20, the main boom driving cylinder 22 is capable of driving the main boom 10 about axis 24 to a substantially horizontal position. See FIG. 2, for example. As a result, the hedger of the present invention, using the telescoping main boom 10, can clear vegetation below the road surface while reaching over obstacles, such as a guard rail 102 on a highway.

Each of the first and second boom members 12, 16 rotatably supports a plurality of cutting blades 26. As illustrated in FIG. 1, the first boom member 12 preferably supports four cutting blades 26, and the second boom member 16 preferably supports three cutting blades 26. The structure for rotating the cutting blades is known and will not be described in further detail.

As illustrated in FIG. 2, the cutting blades 26 of each boom member are disposed alternatingly in front of and behind one another. The blades are disposed so that they slightly overlap along the boom members in a region 104 where the first and second boom members pivot with respect to one another. As a result, no vegetation is missed during hedging regardless of the relative positions of the first and second boom members, and a greater amount of hedging can be accomplished in a single pass. Each of the first and second booms 12, 16 may also be provided with shields 130, 132, respectively, to protect hoses and other portions of the industrial vehicle 1.

The first boom member 12 is pivotable relative to the main boom 10 and the second boom member 16. Similarly, the second boom member 16 is pivotable relative to the first boom member 12 and the main boom 10. The first boom member 12 pivots relative to the main boom 10 over a range of about 180°. To avoid interference of the cutting blades 26 on the second boom member 16 with the cutting blades 26 on the first boom member 12, the second boom member 16 is disposed offset in the vehicle driving direction 100 by a distance defined by the boom member arm 14. The cutting blades 26 of the first and second boom members 12, 16 are substantially vertically aligned in a plane parallel to the vehicle driving direction 100 (FIG. 1). The lowermost cutting blade 26 of the second boom member 16 slightly overlaps the uppermost blade 26 of the first boom member 12 to avoid gaps in cutting the vegetation. In addition to avoiding interference between the cutting blades 26, by disposing the cutting blades 26 of the second boom member 16 offset from the cutting blades 26 of the first boom member 12 by boom member arm 14, debris that is cut by the cutting blades 26 of the second boom member 16 does not get caught in the blades 26 of the first boom member 12.

Figure 1A:
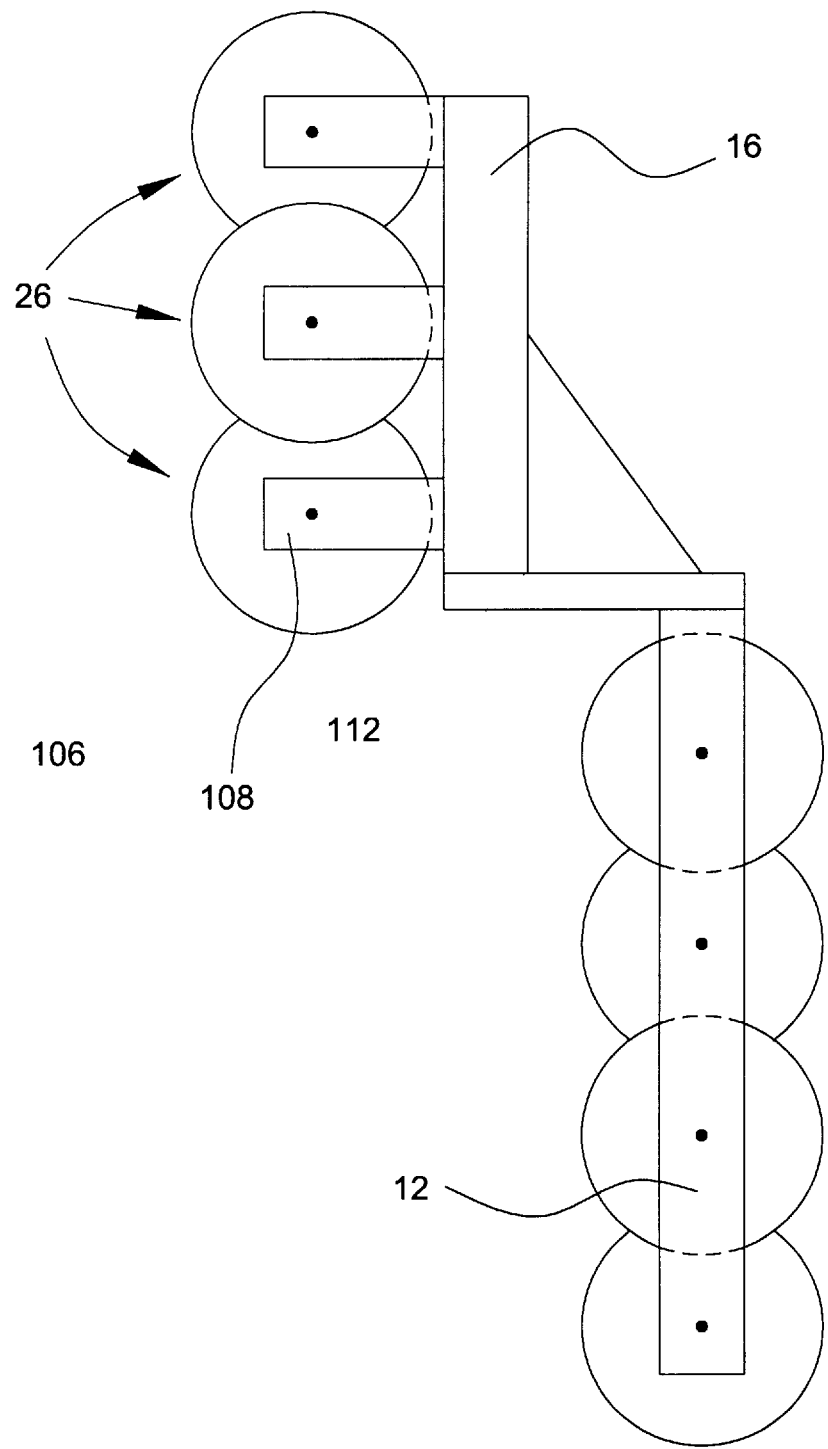
FIG. 1A is a side elevation view of one embodiment of a tubular extension member.

Furthermore, the blades 26 could be mounted up to 18" away from the second boom member 16 using jibs or finger extensions including, for example, an extension member 106 having a first end 108 that connects to a blade 26 and a second end 112 that connects to the second boom member 16. See FIG. 1A. The extension member 106 is particularly useful for hedging awkwardly shaped limbs so that the blades extend well beyond the main boom, i.e., the blades 26 rather than the boom will contact the vegetation. Additionally, the blades of the first boom member 12 could be provided with jibs or tubular extensions. If jibs are used, it would be necessary to provide an adapter or motors (not shown) can be mounted directly on the jib without the need for an adapter.

Furthermore, in accordance with a particularly advantageous aspect of the invention, the hedger can be structured to comport with certification provisions applicable to the Occupational Safety and Health Administration (OSHA). In particular, a portion 114 of the main telescoping boom 10 just above the driving cylinder 22 can be made of an electrically insulating material such as fiberglass or plastic so that electric current that might otherwise be conveyed along the blades to the operator's compartment can be avoided. In addition, any blades that can possibly contact power lines are mounted on a boom member at least partially made of an insulating material such as fiberglass or plastic. Accordingly, the second boom member 16 should be made of an insulating material, and the first boom member can also be made from an insulating material.

Figure 3:
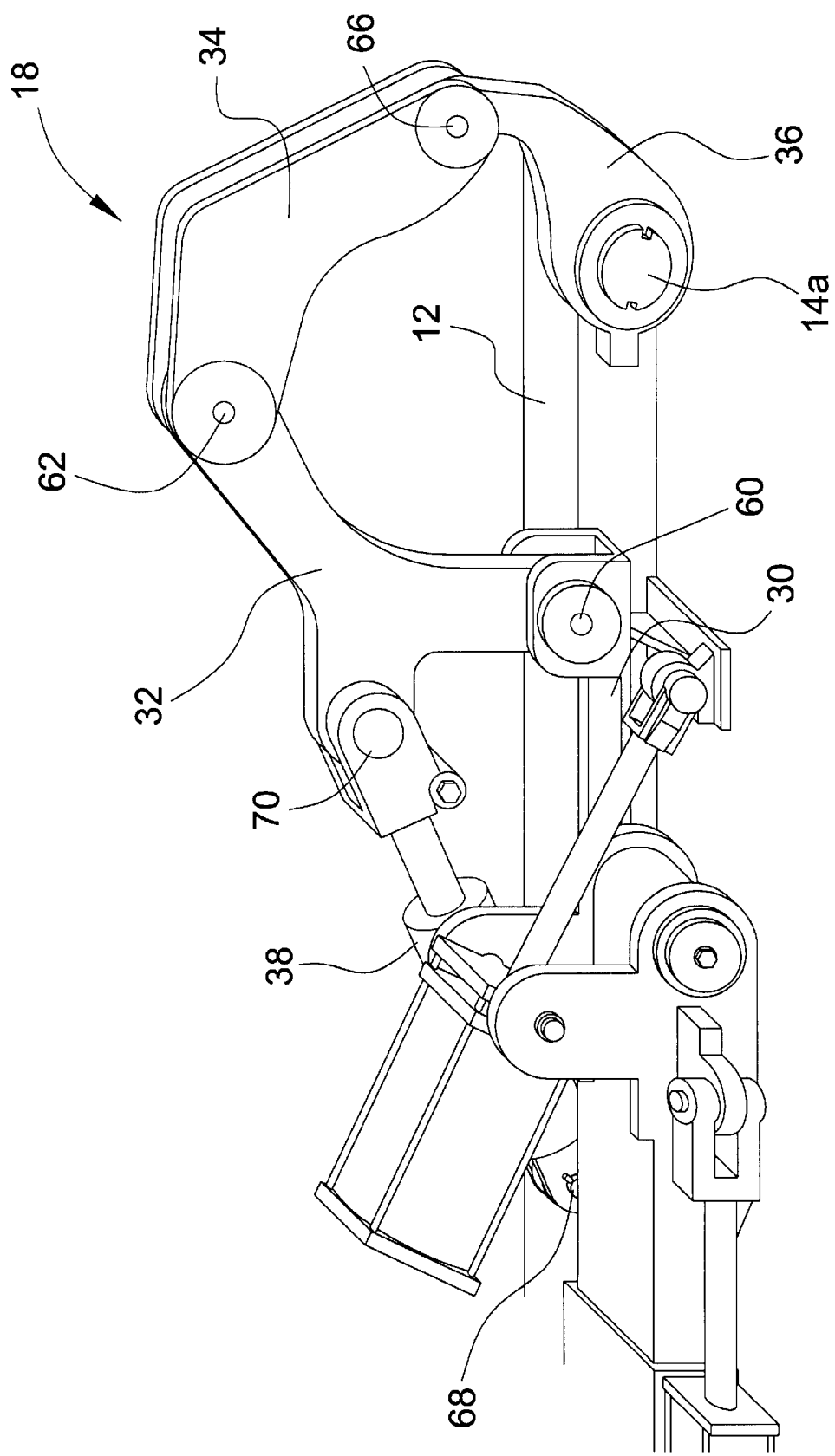
FIG. 3 illustrates a pivot linkage that enables the second boom member to pivot 180° relative to the first boom member.

Referring to FIG. 3, the pivot linkage 18 is configured to enable the second boom member 16 to pivot through 180° relative to the first boom member 12. A fixed portion 30 of the pivot linkage 18 includes two bearing wall members and is fixed to the first boom member 12, for example, by welding. A first linkage arm 32 is inserted between the bearing walls of the fixed portion 30 and is pivotably secured by a pin 60. A second linkage arm 34 is pivotably secured to the first linkage arm 32 at one end by a pin 62. At an opposite end of the second linkage arm 34, the second linkage arm 34 is pivotably attached to a third linkage arm 36 at one end by a pin 66. The third linkage arm 36 is configured to rotate with a rotating axle 14a of the boom member arm 14, which is not illustrated in FIG. 3 for clarity. A driving cylinder 38 is fixed at one end 68 to the first boom member 12 and at an opposite end 70 to an interim portion of the first linkage arm 32. As a result of this structure, the second boom member 16 can be pivoted through 180° relative to the first boom member 12.

Figure 4:
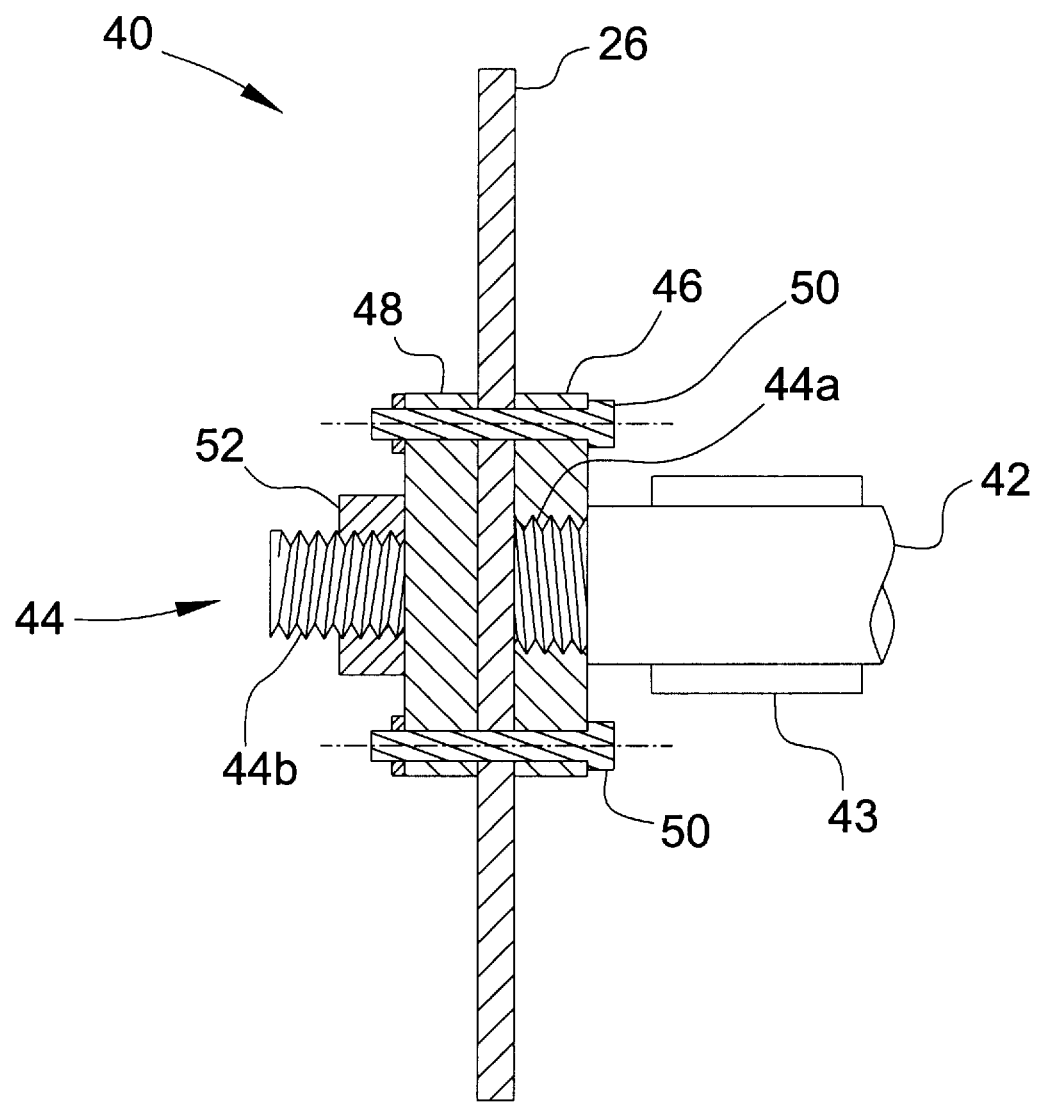
FIG. 4 is a sectional view of the blade coupling unit according to the present invention.
Figure 4A:
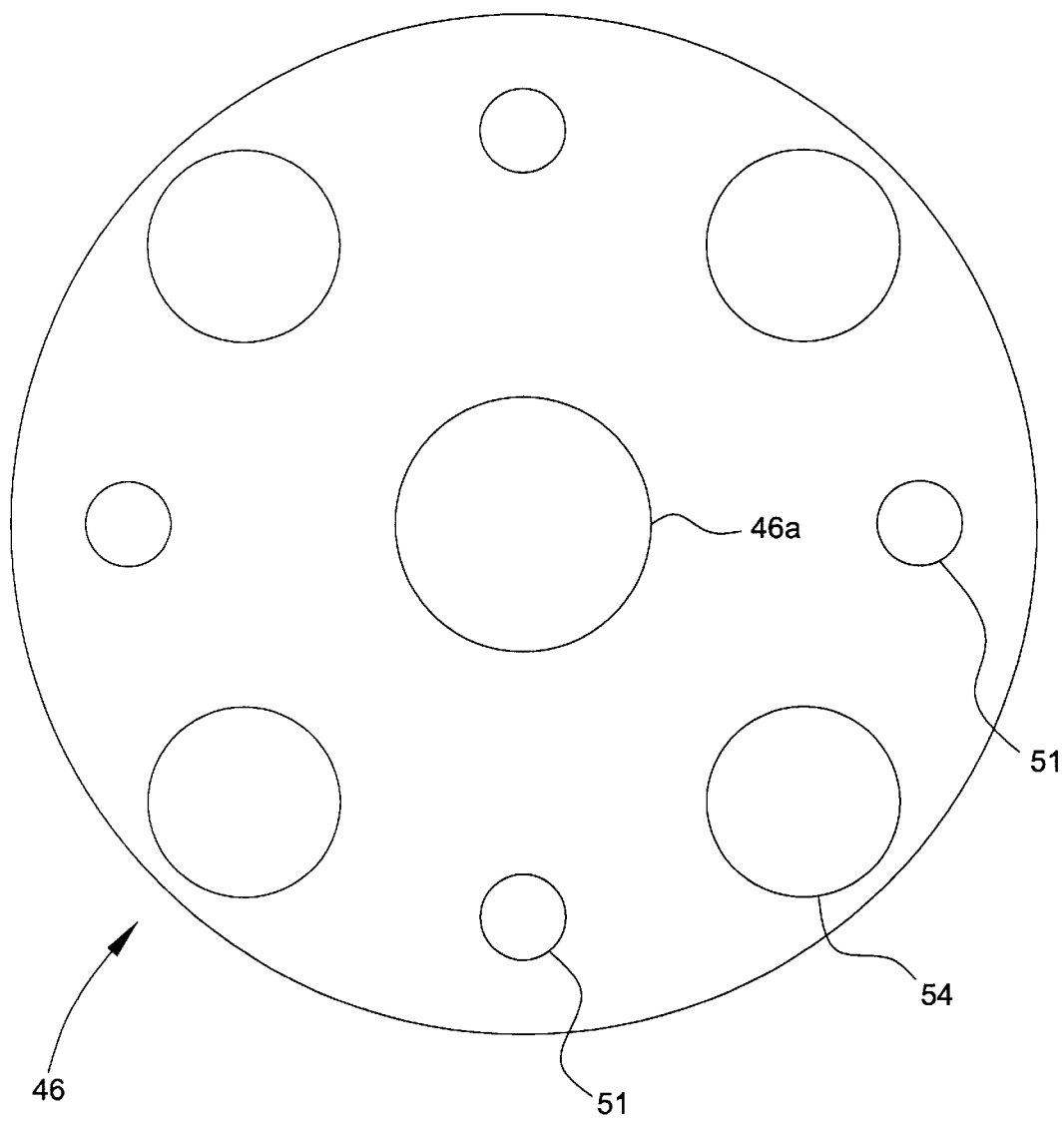
FIGS. 4A and 4B are detail views of, respectively, a back plate and a front plate of the blade coupling unit.
Figure 4B:
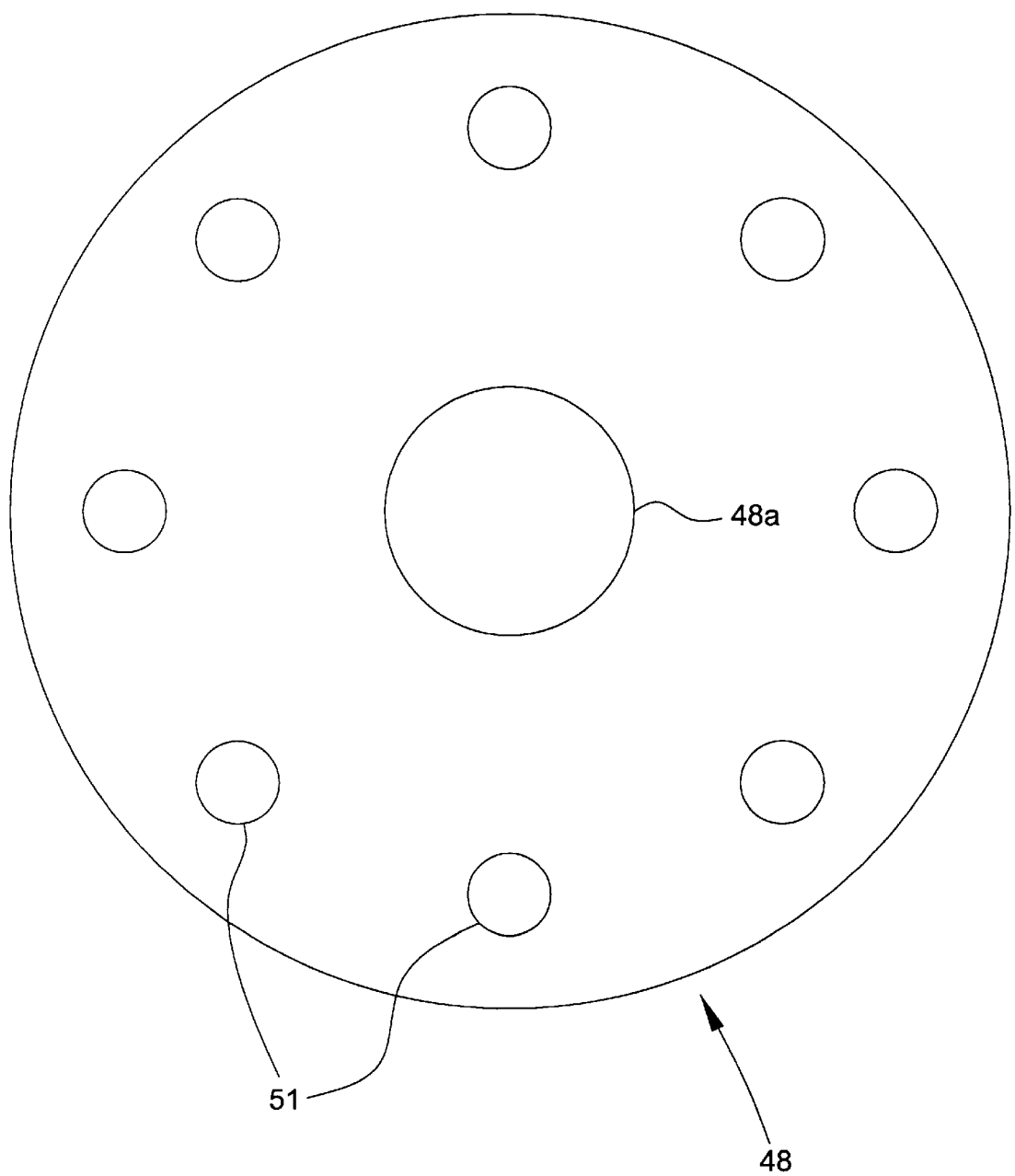

With reference to FIG. 4, each of the cutting blades 26 is fixed to a respective one of the first and second boom members 12, 16 by a blade coupling unit 40. A rotatable blade shaft 42 is rotatably mounted in a bearing 43 and includes a threaded end portion 44. A threaded through hole 46a (FIG. 4A) of a threaded back plate 46 is first threaded on a threaded portion 44a of the rotatable blade shaft 42. The unthreaded cutting blade 26 is fitted over the threaded end portion 44, and an unthreaded through hole 48a (FIG. 4B) of a front plate 48 is fitted over the threaded end portion 44, sandwiching the blade 26 between the back plate 46 and the front plate 48, thus constituting a first locking mechanism. A plurality of bolts 50, preferably four, are extendible through holes 51 in the back plate 46, blade 26 and front plate 48 as a second locking mechanism. A nut 52 is threaded onto portion 44b of the threaded end portion 44 extending outside of the front plate 48. The nut 52 constitutes a third locking mechanism.

The threads of the threaded end portion 44 are configured so that a threaded through hole 46a of the back plate 46 is left-handed threaded on the threaded portion 44a in a direction opposite the rotation direction of the cutting blade, and the nut 52 is right-hand threaded on the threaded portion 44b in the same direction as the rotation direction of the cutting blade 26. As a result, the cutting blade 26 is positively prevented from coming loose during rotation and also in the event of encountering an obstacle that suddenly halts the rotation of the cutting blade 26.

The back plate 46 and front plate 48 are fixed to each other with bolts 50 that extend through four bolt holes 51, as noted above. The front plate may include additional bolt holes (FIG. 4B) to facilitate alignment and to reduce the weight thereof, and the back plate is additionally fitted with a plurality of wrench holes 54, preferably four. See FIG. 4A. The wrench holes are configured to receive a wrench for fixing and removing the back plate 46 to and from the threaded portion 44a of the rotatable blade shaft 42. Moreover, the wrench holes reduce the weight of the back plate 46.

Figure 5A:
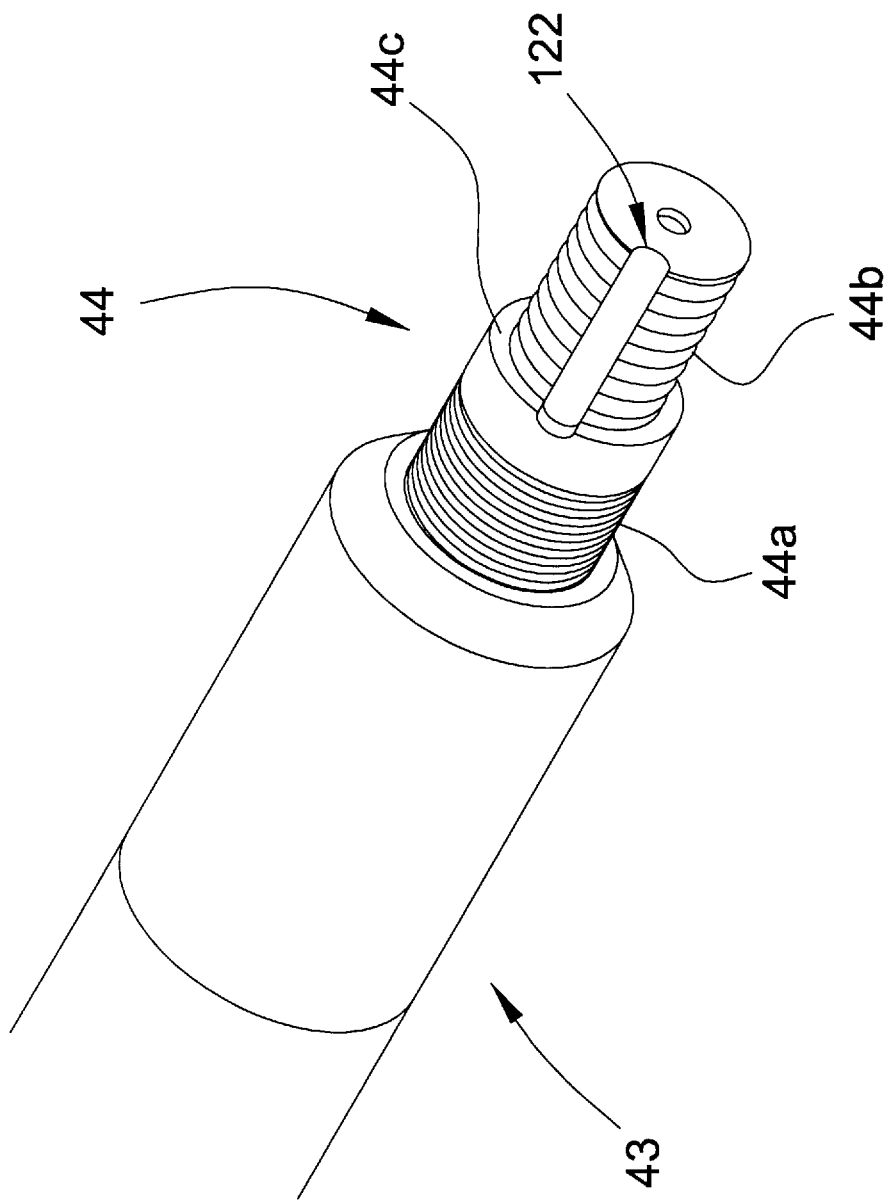
FIG. 5A is a detail perspective view of a rotatable blade shaft of the blade coupling unit.
Figure 5B:
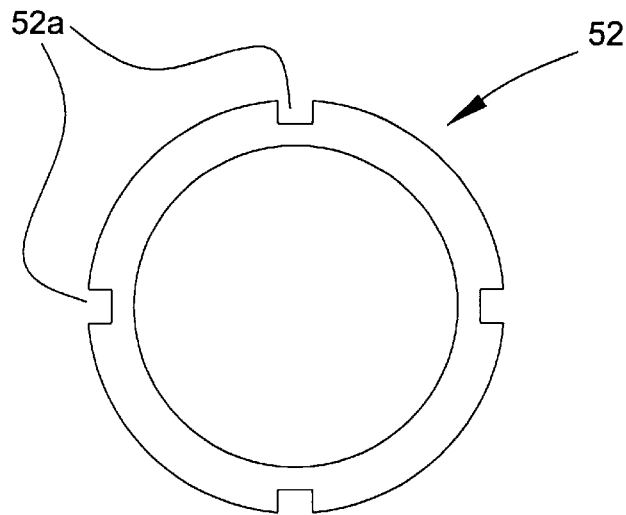
FIGS. 5B and 5C are detail views of, respectfully, a locking nut and a locking washer.
Figure 5C:
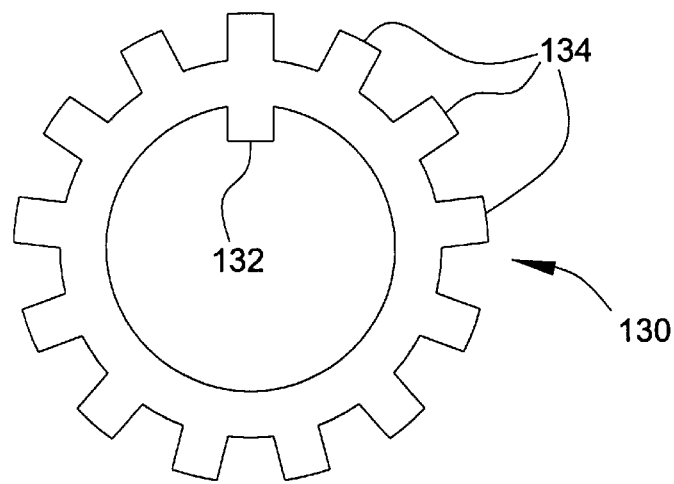

In addition, the shaft 44b may be provided with a groove 122 (FIG. 5A) that cooperates with a locking washer 130 (FIG. 5C). The locking washer 130 includes at least one inwardly oriented tab 132 that is inserted within the groove 122 when the locking washer 130 slides over the shaft 44b to abut the end face 44c of the threaded end portion 44. The locking washer 130 is thus prevented from relative rotative movement with respect to the shaft 42. The threaded nut 52 is tightened on the threaded end 44b after the locking washer 130 is in place. In FIG. 5B, the nut 52 is shown to have a plurality of recesses 52a that cooperate with respective ones of a plurality of outwardly oriented tabs 134 of the locking washer 130. Once the nut 52 is tightened to the shaft 44b, the tabs 134 that are aligned with respecive recesses 52a are bent until the tabs 134 positively engage and enter the recesses 52a. Accordingly, the locking washer 130 and the nut 52 are prevented from rotating with respect to the shaft 42. Furthermore, an elongated aperture 118 is provided on shaft 42 in which a set screw is adjustably positioned to engage the shaft 42.

Figure 6A:
FIGS. 6A–6E schematically illustrate different types of cutting profiles

FIGS. 6A–6E illustrate schematic cutting planes and graphically illustrate the versatility with which the hedger of the present construction can shape vegetation profiles. Basically, the hedger can cut continuous vegetation profiles depending on the characteristics of the vegetation and the surrounding landscape. For example, if a single plane vertical wall is desired, the cutting arms 12 and 16 are substantially vertically aligned and the vegetation can be hedged in the shape of a vertical planar wall (FIG. 6A). Similarly, the arms 12 and 16 can be substantially horizontally aligned (FIG. 6D) to form the vegetation to have a horizontally planar profile.

Figure 6B:
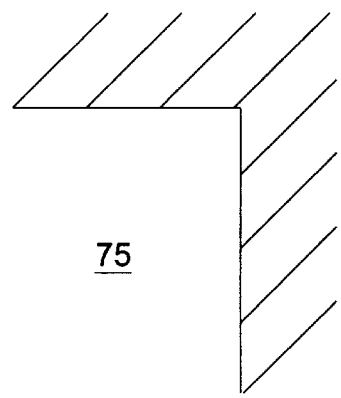
Figure 6C:
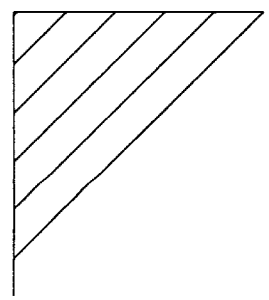
Figure 6D:
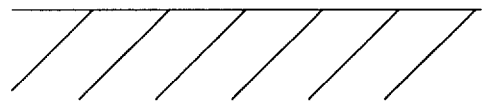
Figure 6E:
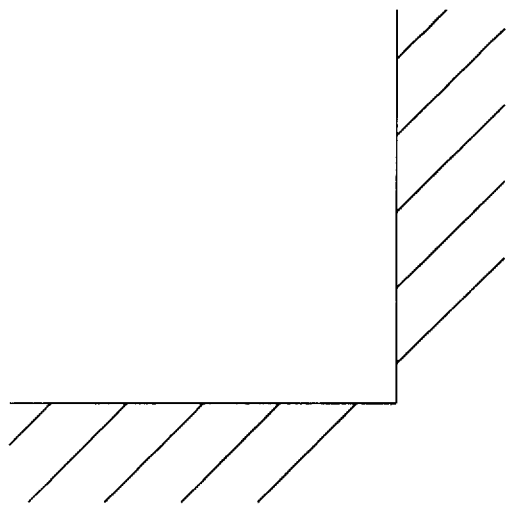

The blades of the first and second boom members 12 and 16, through pivot linkage 18, can also be arranged to form the profile in FIG. 6B in which a passageway 75 is formed, and to form the profile shown in FIG. 6C, which is desirable to cut vegetation below power lines. Additionally, the first boom member 12 can be substantially horizontal while the second boom member 16 can extend vertically upward or at an angle from the first boom member 16, as shown in FIG. 6E (and FIG. 2). In FIGS. 6B, 6C and 6E, the respective cutting planes are substantially perpendicular to each other, but other cutting angles are, of course, also possible. In addition, the multiplanar cutting profiles are also continuous as a result of the overlapping relation of the blades in the region 104, as described above in connection with FIG. 2.

While this invention has been described in conjunction with specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A hedger comprising:

a frame equipped with a motive device;

a raisable platform mounted on the frame adjacent the motive device;

a telescoping main boom member pivotably attached at one end to said platform; and at least a first boom member pivotably attached to and extending in a first direction from an opposite end of said main boom member, said first boom member rotatably supporting at least one cutting blade.

2. A hedger according to claim 1, further comprising a second boom member pivotably attached to an end portion of said first boom member and extending in a second direction from said opposite end of said main boom member, said second boom member rotatably supporting at least one cutting blade.

3. A hedger according to claim 2, further comprising a driving device that pivotably drives said second boom member relative to said first boom member and a pivot linkage coupling said driving device and said second boom member, said pivot linkage being configured to enable said second boom member to pivot 180° relative to said first boom member.

4. A hedger according to claim 3, wherein said pivot linkage comprises:
 a fixed portion fixed to said end portion of said first boom member;
 a first linkage arm pivotably attached to said fixed portion;
 a second linkage arm pivotably attached to said first linkage arm; and
 a third linkage arm pivotably attached at one end to said second linkage arm and at an opposite end to said end portion of said first boom member spaced from said fixed portion, said third linkage arm being structured for rotation with said second boom member.

5. A hedger according to claim 4, wherein said first linkage arm is pivotably attached to said fixed portion with a pin, said second linkage arm is pivotably attached to said first linkage arm with a pin, and said third linkage arm is pivotably attached to said second linkage arm and to said end portion of said first boom member by respective pins.

6. A hedger according to claim 2, wherein said first boom member is disposed offset from said second boom member in a hedger driving direction.

7. A hedger according to claim 6, wherein said at least one cutting blade mounted on said first boom member is aligned with said at least one cutting blade mounted on said second boom member in a plane substantially parallel to said hedger driving direction.

8. A hedger according to claim 6, wherein said first boom member comprises a plurality of cutting blades and wherein said second boom member comprises a plurality of cutting blades, an uppermost one of said cutting blades mounted on said first boom member being disposed overlapping a lowermost one of said cutting blades mounted on said second boom member in a plane substantially parallel to said hedger driving direction.

9. A hedger according to claim 2, wherein at least a portion of said main telescoping boom member includes an electrically insulative material.

10. A hedger according to claim 9, wherein said insulative material includes at least one of fiberglass and plastic.

11. A hedger according to claim 9, wherein at least said second boom member comprises a portion made of an insulative material.

12. A hedger according to claim 1, wherein said platform is pivotably attached to said hedger, said hedger further comprising a platform tilting device coupled to said platform that tilts said platform about an axis substantially perpendicular to a hedger driving direction.

13. A hedger according to claim 1, wherein said platform comprises a platform arm extending from one side of said platform, said telescoping main boom member being attached to said platform at an opposite side of said platform, the hedger further comprising a main boom driving device attached at one end to said platform arm spaced from said platform and at an opposite end to said telescoping main boom member.

14. A hedger according to claim 1, further comprising means for enabling said telescoping main boom member to be pivoted to a horizontal position.

15. A hedger according to claim 1, wherein said at least one cutting blade is attached to said first boom member on a rotatable blade shaft with a blade coupling unit, the blade coupling unit comprising:
 a back plate secured to said rotatable blade shaft and disposed on a hedger side of said blade;
 a front plate disposed on an outer side of said blade, thereby sandwiching said blade with said back plate;
 at least one bolt secured through a corresponding at least one hole in said back plate, said cutting blade and said front plate; and
 a locking member fixed to said rotatable blade shaft outside of said front plate such that said front plate is sandwiched between said locking member and said cutting blade.

16. A hedger according to claim 15, wherein said rotatable blade shaft comprises a threaded end portion extendible through a central hole in said back plate, said cutting blade and said front plate, said back plate being threaded in a first direction on said threaded end portion and said locking member being threaded in a second direction on said threaded end portion.

17. A hedger according to claim 16, wherein said first direction corresponds to a direction opposite from a blade rotation direction, and wherein said second direction corresponds to said blade rotation direction.

18. A hedger according to claim 15, wherein said back plate comprises a plurality of wrench holes configured to receive a wrench for removing said back plate from said rotatable blade shaft.

19. A hedger according to claim 15, wherein said back plate, said cutting blade and said front plate each includes four bolt holes for receiving four bolts.

20. A hedger according to claim 15, wherein said back plate comprises a plurality of wrench holes configured to receive a wrench for removing said back plate from said rotatable blade shaft.

21. A hedger comprising:
 a main boom;
 a first boom member coupled with said main boom to pivot over a range of about 180° with respect to the main boom, the first boom member having at least a first cutting blade; and
 a second boom member pivotably connected to said first boom member, said second boom member having at least a second cutting blade,
 wherein said first and second blades form a continuous cutting profile regardless of the relative positioning of the first and second boom members.

22. A hedger according to claim 21, further comprising a platform to which a first end of the main boom is pivotably attached about a pivot, said platform including a platform arm having a main boom drive cylinder, said main boom drive cylinder being pivotably attached to a portion of said main boom such that said main boom can assume a substantially horizontal position.

23. A hedger according to claim 22, wherein said platform includes structure for raising and lowering a position of the platform.

24. A hedger according to claim 22, wherein said platform includes structure for pivoting the platform about an axis substantially perpendicular to an axis of said pivot.

25. A hedger according to claim 22, wherein said main boom includes an electrically insulative fiberglass portion located above a point where said drive cylinder is attached to said main boom.

26. A hedger according to claim 21, further comprising a jib disposed between at least one of said first and second boom members and at least one of said first and second blades.

27. A blade coupling unit for securing a cutting blade to a rotatable blade shaft, the blade coupling unit comprising:
- a back plate secured to said rotatable blade shaft and disposed on an inner side of said blade;
- a front plate disposed on an outer side of said blade, thereby sandwiching said blade with said back plate;
- at least one bolt secured through a corresponding at least one hole in said back plate, said cutting blade and said front plate; and
- a locking member fixed to said rotatable blade shaft outside of said front plate such that said front plate is sandwiched between said locking member and said cutting blade,
- wherein said rotatable blade shaft comprises a threaded end portion extendible through a central hole in said back plate, said cutting blade and said front plate, said back plate being threaded in a first direction on said threaded end portion and said locking member being threaded in a second direction on said threaded end portion.

28. A blade coupling unit according to claim 27, wherein said first direction corresponds to a direction opposite from a blade rotation direction, and wherein said second direction corresponds to said blade rotation direction.

29. A blade coupling unit according to claim 27, wherein said back plate comprises a plurality of wrench holes configured to receive a wrench for removing said back plate from said rotatable blade shaft.

30. A blade coupling unit according to claim 27, wherein said back plate, said cutting blade and said front plate each includes four bolt holes for receiving four bolts.

31. A blade coupling unit according to claim 30, wherein said back plate comprises a plurality of wrench holes configured to receive a wrench for removing said back plate from said rotatable blade shaft.

32. An industrial vehicle comprising:
- a frame;
- a motive device mounted on the frame;
- a platform mounted on the frame adjacent the motive device;
- lifting structure that selectively lifts the platform with respect to the frame between a raised position and a lowered position; and
- a main boom member associated with an industrial implement, the main boom member being pivotally coupled to the platform.

33. A method for cutting vegetation using a hedger having cutting blades mounted on at least two relatively pivotable boom members, said method comprising:
- mounting the hedger on a vehicle that travels along said vegetation;
- providing a menu of cutting profiles in which the two boom members span a cutting range encompassing substantially single plane cutting profiles and at least two substantially perpendicular multiple plane profiles;
- selecting a selected cutting profile from said menu of cutting profiles;
- adjusting the cutting blades to create the selected cutting profile; and
- cutting the vegetation with the blades based on said selected cutting profile as the vehicle travels along the vegetation.

34. A method according to claim 33, wherein said cutting includes cutting a substantially horizontal single plane profile, a substantially vertical single plane profile, and multiple plane profiles having both vertical and horizontal components.

35. A method according to claim 33, wherein said selected cutting profile is a vertical plane cutting profile, and wherein said method further comprises adjusting the cutting blades to add a horizontal component to the vertical cutting profile.

36. A method according to claim 33, wherein said selected cutting profile is a horizontal profile, and wherein said method further comprises adjusting the cutting blades to add a vertical component to the horizontal cutting profile.

37. A method according to claim 33, wherein said selected cutting profile is a multiple plane profile, and wherein said method further comprises adjusting the cutting blades to transform said multiple plane profile into a single plane profile.

38. An industrial vehicle comprising:
- a frame;
- a motive device mounted on the frame;
- a platform mounted on the frame adjacent the motive device;
- lifting structure for selectively lifting the platform with respect to the frame between a raised position and a lowered position;
- a main boom member associated with an industrial implement, the main boom member being pivotally coupled to the platform; and
- tilting structure for tilting the platform about an axis substantially perpendicular to a driving direction of the vehicle.

39. An industrial vehicle comprising:
- a frame;
- a motive device mounted on the frame;
- a raisable platform mountd on the frame adjacent the motive device;
- an extendible boom member operatively associated with an industrial implement, the main boom member being pivotably coupled to the platform: and
- tilting structure that tilts the platform about an axis substantially perpendicular to a driving direction of the vehicle.

* * * * *